US007278614B2

(12) United States Patent
Caveney et al.

(10) Patent No.: US 7,278,614 B2
(45) Date of Patent: Oct. 9, 2007

(54) CABLE MOUNT AND FIXTURE HAVING ELECTRICAL SWITCH ASSEMBLY

(75) Inventors: Jack E. Caveney, Hinsdale, IL (US); Marty J. Kronz, Cumming, GA (US); Gary L. Zemach, Cumming, GA (US)

(73) Assignee: Panduit Corp., Tinley Park, IL (US)

( * ) Notice: Subject to any disclaimer, the term of this patent is extended or adjusted under 35 U.S.C. 154(b) by 111 days.

(21) Appl. No.: 10/927,304

(22) Filed: Aug. 26, 2004

(65) Prior Publication Data

US 2005/0067537 A1 Mar. 31, 2005

Related U.S. Application Data

(60) Provisional application No. 60/499,148, filed on Aug. 29, 2003.

(51) Int. Cl.
*F16L 3/08* (2006.01)

(52) U.S. Cl. .......................................... 248/65; 248/49

(58) Field of Classification Search .................. 248/65, 248/49, 67.7, 74.2, 69
See application file for complete search history.

(56) References Cited

U.S. PATENT DOCUMENTS

| | | | | |
|---|---|---|---|---|
| 4,042,123 | A * | 8/1977 | Sheldon et al. | 414/22.71 |
| 4,073,200 | A * | 2/1978 | Plate et al. | 74/502.4 |
| 4,462,523 | A * | 7/1984 | Kerr | 198/810.02 |
| 4,609,910 | A | 9/1986 | Geringer et al. | |
| 4,992,777 | A | 2/1991 | Keisuke et al. | |
| 5,015,996 | A | 5/1991 | Konishi et al. | |
| 5,243,325 | A | 9/1993 | Marin et al. | |
| 5,368,261 | A | 11/1994 | Caveney et al. | |
| 5,654,788 | A | 8/1997 | Kuhn, Jr. | |
| 5,714,940 | A | 2/1998 | Fishovitz et al. | |
| 5,799,906 | A | 9/1998 | Hillegonds | |
| 6,043,433 | A * | 3/2000 | Schweitzer, Jr. | 174/70 R |
| 6,732,893 | B2 * | 5/2004 | Morris et al. | 224/537 |
| 6,910,840 | B2 * | 6/2005 | Anscher | 411/41 |

* cited by examiner

*Primary Examiner*—Amy J. Sterling
(74) *Attorney, Agent, or Firm*—Robert A. McCann; Christopher S. Clancy

(57) ABSTRACT

A cable mount and fixture system is disclosed. The system includes a mounting fixture, a cable mount insertable into the mounting fixture, and a switch assembly connected to the mounting fixture. The switch assembly includes an actuating signal that verifies that the cable mount is correctly installed in the mounting fixture.

10 Claims, 5 Drawing Sheets

CABLE MOUNT AND FIXTURE HAVING ELECTRICAL SWITCH ASSEMBLY

CROSS-REFERENCE TO RELATED APPLICATIONS

This application claims priority to U.S. Provisional Application Ser. No. 60/499,148, filed on Aug. 29, 2003.

BACKGROUND OF THE INVENTION

The present invention is directed to a cable mount and fixture and, more particularly, a cable mount and fixture having an electrical switch assembly that provides electrical verification that a cable mount is correctly installed in the fixture.

Cable mounts which can be secured to a bundle of wires by application of a single cable tie, preferably by an automatic tool, and a fixture for supporting the cable mount during application of the cable tie are known. For example, Panduit U.S. Pat. Nos. 5,368,261 and 5,799,906 disclose a cable mount and accompanying fixture for supporting the cable mount during application of a cable tie. However, none of the prior art references, including the '261 and '906 patents, provide an electrical switch assembly that provides electrical verification that the cable mount is correctly installed in the fixture.

It would be desirable to provide a cable mount and fixture having an electrical switch assembly that informs a user when the cable mount is correctly installed in the fixture.

SUMMARY OF THE INVENTION

A cable mount and fixture system is disclosed. The system includes a mounting fixture, a cable mount insertable into the mounting fixture, and a switch assembly connected to the mounting fixture. The switch assembly includes an actuating signal that verifies that the cable mount is correctly installed in the mounting fixture.

Preferably, the switch assembly includes a contact pin extending into an opening defined within the mounting fixture, and the contact pin further includes an insulating washer. Upon inserting the cable mount into the mounting fixture, the cable mount engages the contact pin.

Preferably, the switch assembly includes a plastic housing and a metal right angle arm connected to the plastic housing. Moreover, the metal right angle arm is in contact with the contact pin. Alternatively, the switch assembly may include a plastic right angle arm and a metal plate inserted on the right angle arm to allow current to flow between two metal contacts.

Preferably, the cable mount has a plurality of retention tabs to improve friction between the cable mount and the wires. The additional friction provided by the retention tabs minimizes slippage of wires across the top of the cable mount.

Preferably, the mounting fixture, the contact pin, the right angle arm and the contacts are metal. Moreover, the housing and the insulating washer are plastic.

DETAILED DESCRIPTION OF PREFERRED EMBODIMENTS

The illustrated embodiments of the invention are directed to a cable mount and fixture having an electrical switch assembly that provides electrical verification that a cable mount is correctly installed in the fixture.

Figure 1:
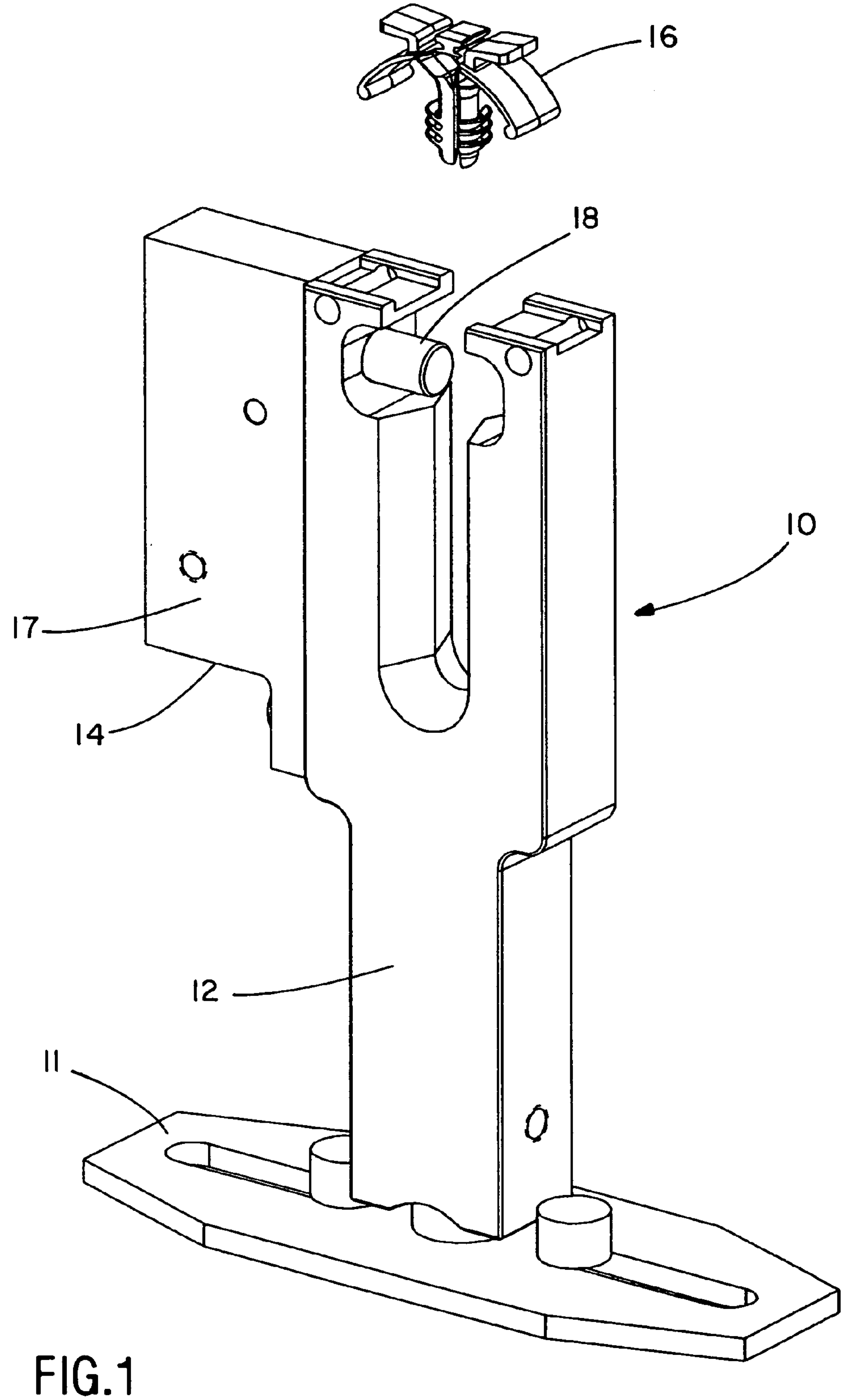
FIG. 1 is an exploded perspective view of a cable mount and fixture having an electrical switch assembly according to the present invention.
Figure 2:
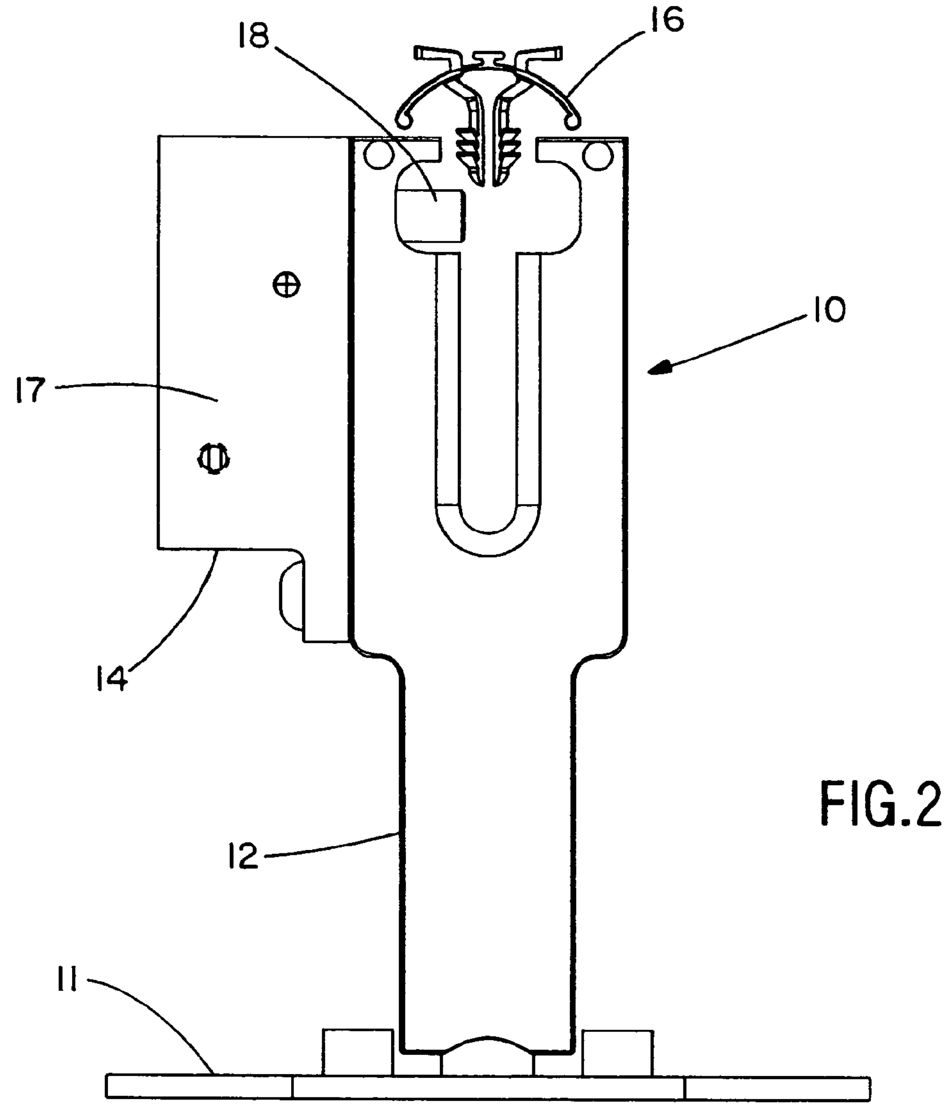
FIG. 2 is a front view of the cable mount and fixture of FIG. 1, as the cable mount is inserted into the fixture.
Figure 3:
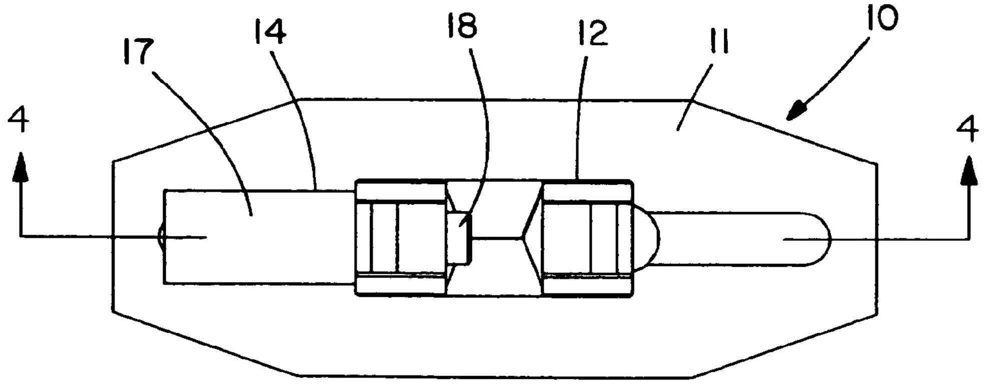
FIG. 3 is a top view of the cable mount and fixture of FIG. 1, with the cable mount removed.

FIG. 1 shows a cable mount and fixture having electrical switch assembly 10. As shown in FIGS. 1-6, assembly 10 includes base 11 mountable to a harness board (not shown) utilizing fasteners or other securement devices. Mounting fixture 12, such as the one disclosed in U.S. Pat. No. 5,799,906, mounts to base 11. Assembly 10 also includes a switch assembly 14 secured to mounting fixture 12 utilizing a fastener or other securement device. Switch assembly 14 includes an actuating signal that informs a user when cable mount 16, such as the one disclosed in U.S. Pat. No. 5,368,261, is correctly installed into mounting fixture 12. The disclosures of U.S. Pat. Nos. 5,799,906 and 5,368,261 are incorporated by reference.

Figure 4:
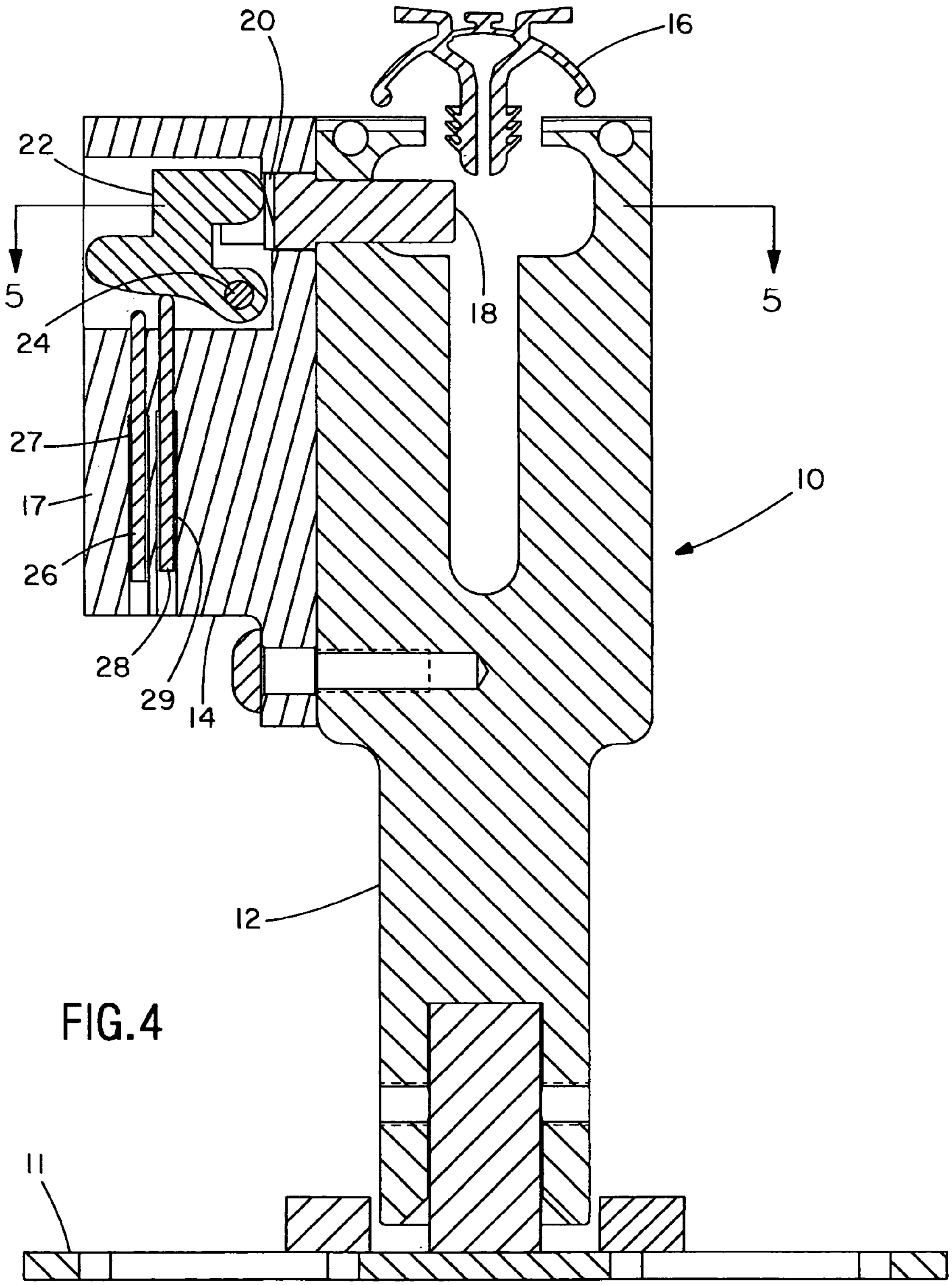
FIG. 4 is a cross-sectional view taken along lines 4-4 of FIG. 3.
Figure 5:
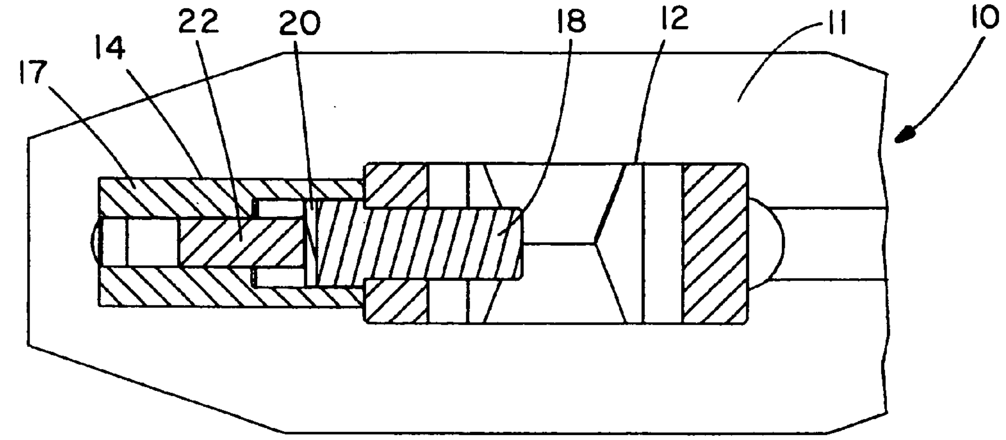
FIG. 5 is a cross-sectional view taken along lines 5-5 of FIG. 4.

As best seen in FIG. 4, switch assembly 14 has a housing 17, a contact pin 18, a right angle arm 22 having pivot point 24 and contacts 26, 28. Contact pin 18 slip fits into a side of mounting fixture 12, and extends into an opening defined within mounting fixture 12. Contact pin 18 includes insulating washer 20, which provides electrical insulation between contact pin 18 and right angle arm 22. Right angle arm 22 is connected to housing 17 at pivot point 24, and right angle arm 22 is in contact with contact pin 18. As shown in FIG. 4, the electrical circuit comprising right angle arm 22 and contacts 26, 28 is open. Contacts 26, 28 include sleeves 27, 29 respectively, which support spring pins (not shown) positioned therein.

Preferably, mounting fixture 12, contact pin 18, right angle arm 22 and contacts 26, 28 are metal. Similarly, housing 17 and insulating washer 20 are plastic. However, it is likewise contemplated that these components may be made of other materials. For example, right angle arm 22 may be plastic. In such a design, a metal plate would be inserted on plastic right angle arm 22 to allow current to flow between contacts 26, 28.

Figure 6:
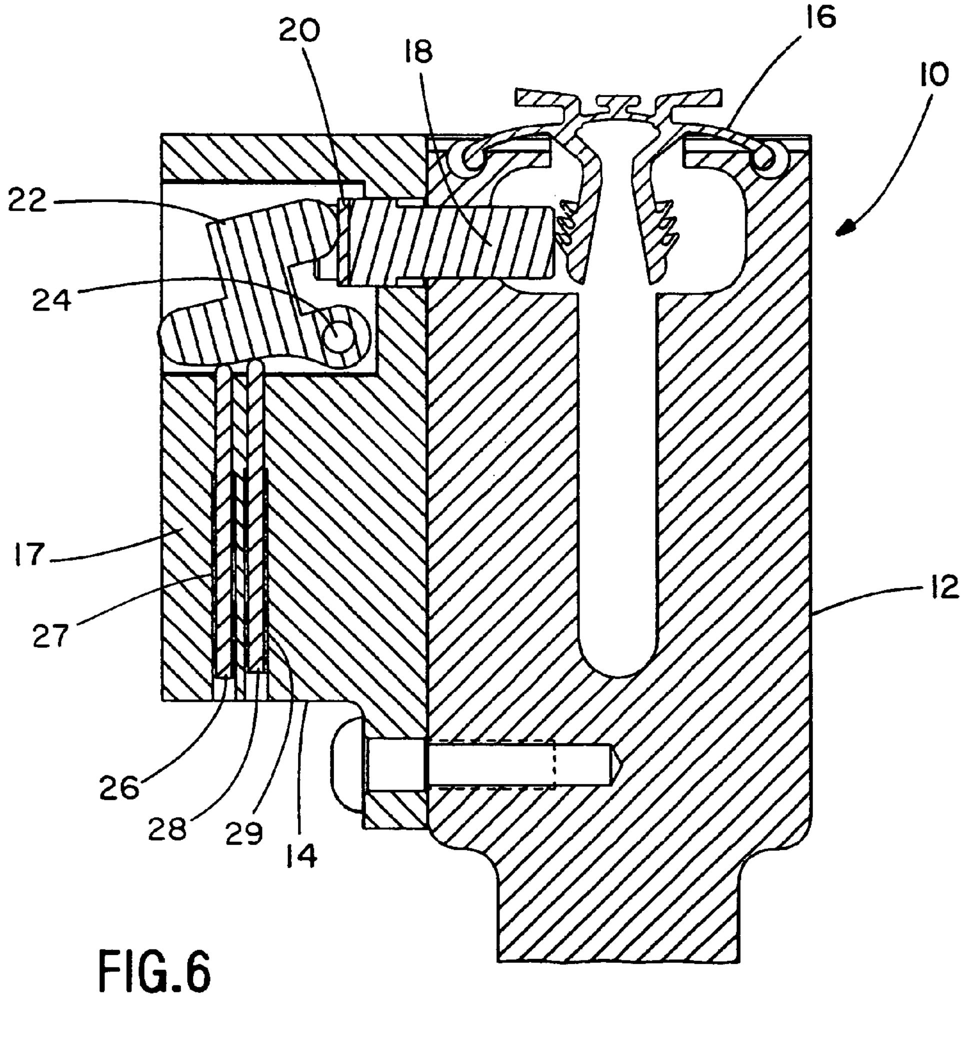
FIG. 6 is a cross-sectional view similar to FIG. 4, after the cable mount is inserted into the fixture.

In operation, and as best seen in FIG. 6, when cable mount 16 is installed into mounting fixture 12, the legs of cable mount 16 spread apart and the barbs of cable mount 16 push contact pin 18 toward metal right angle arm 22, causing right angle arm 22 to rotate about pivot point 24. The bottom face of right angle arm 22 is contoured such that right angle arm 22 exerts primarily downward force on metal contacts 26, 28. In fact, right angle arm 22 exerts little, if any, sideload on metal contacts 26, 28. When right angle arm 22 engages metal contacts 26, 28, the electrical circuit is closed. Wires extending from contacts 26, 28 are connected to a central processing unit, such as a computer, which activates a light emitting diode (LED) or sends an audible signal to indicate that cable mount 16 is correctly installed in mounting fixture 12.

Figure 7:
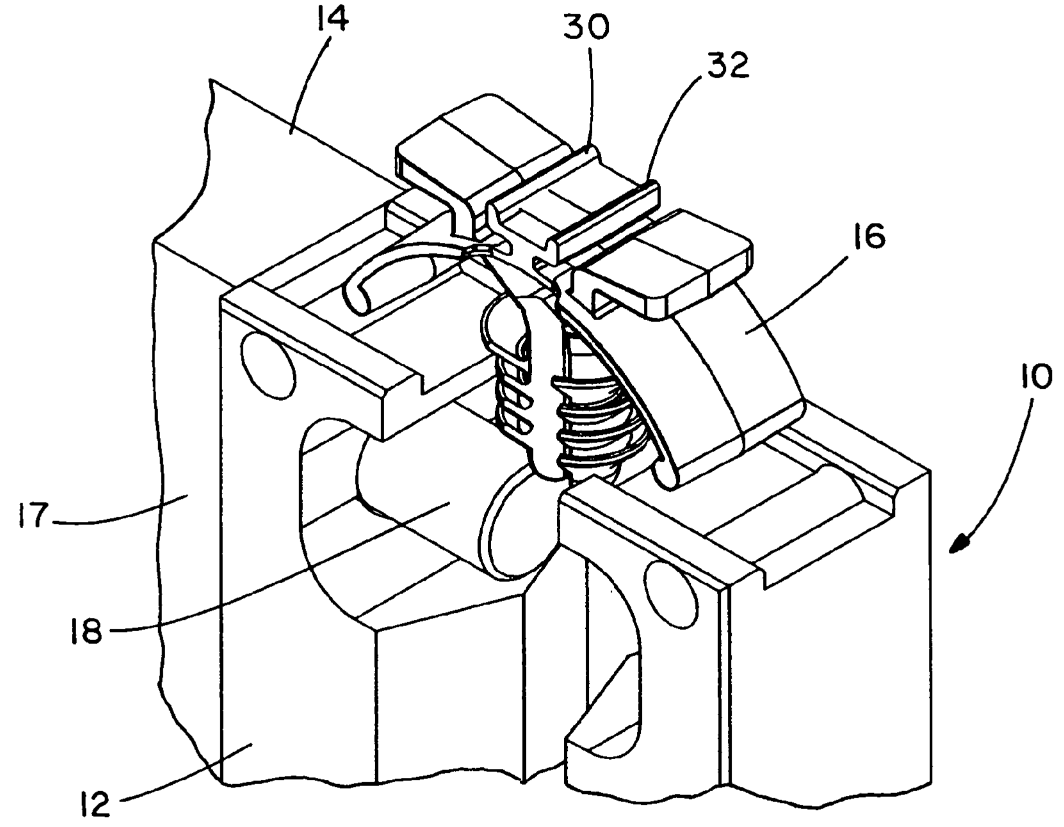
FIG. 7 is an enlarged perspective view of a cable mount according to another embodiment of the present invention.
Figure 8:
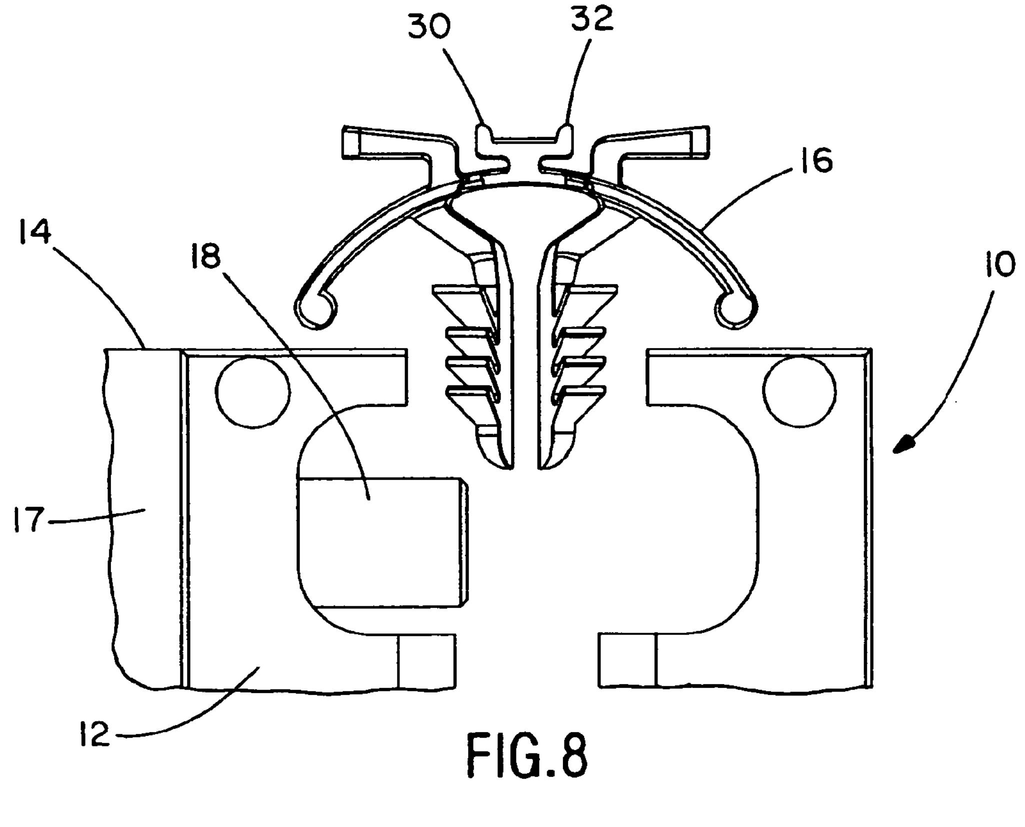
FIG. 8 is an enlarged front view of the cable mount of FIG. 7, as the cable mount is inserted into the fixture.

FIGS. 7 and 8 show an alternate embodiment of cable mount 16. The cable mount disclosed in FIGS. 7 and 8 is similar to the cable mount disclosed in U.S. Pat. No. 5,368,261, except that the cable mount saddle support has two retention tabs 30, 32 to improve friction between cable mount 16 and the wires. The additional friction provided by retention tabs 30, 32 minimizes slippage of wires across the top of cable mount 16.

The disclosed invention provides a cable mount and fixture having an electrical switch assembly that provides user feedback when the cable mount is properly installed in the fixture. It should be noted that the above-described and illustrated embodiments and preferred embodiments of the invention are not an exhaustive listing of the forms such an assembly in accordance with the invention might take; rather, they serve as exemplary and illustrative of embodiments of the invention as presently understood. Many other forms of the invention are believed to exist.

The invention claimed is:

1. A cable mount and fixture system comprising:
- a base;
- a mounting fixture mountable to the base, the mounting fixture having an opening for receiving a cable mount;
- a cable mount having at least one leg including at least one barb, the cable mount insertable into the opening of the mounting fixture; and
- a switch assembly connected to the mounting fixture, the switch assembly includes a contact pin extending into an opening defined within the mounting fixture, a right angle arm and a plurality of contacts, wherein the switch assembly includes an actuating signal that verifies that the cable mount is correctly installed in the mounting fixture.

2. The system of claim 1, wherein the switch assembly includes a metal right angle arm connected to a plastic housing at a pivot point and in contact with the contact pin.

3. The system of claim 1, wherein the switch assembly includes a plastic right angle arm connected to a plastic housing at a pivot point and a metal plate is inserted on the right angle arm, the metal plate in contact with a plurality of metal contacts.

4. The system of claim 1, wherein the cable mount engages the contact pin upon insertion of the cable mount into the mounting fixture.

5. The system of claim 1, wherein the cable mount has a plurality of retention tabs.

6. The system of claim 1, wherein the contact pin further includes an insulating washer.

7. The system of claim 1, wherein each contact includes a sleeve positioned thereabout.

8. The system of claim 1, wherein the mounting fixture and the contact pin are metal.

9. A cable mount and fixture system comprising:
- a base:
- a mounting fixture mountable to the base the mounting fixture having an opening for receiving a cable mount;
- a cable mount having at least one leg including at least one barb, the cable mount insertable into the opening of the mounting fixture; and
- a switch assembly connected to the mounting fixture, the switch assembly includes a contact pin extending into an opening defined within the mounting fixture and a metal right angle arm connected to a plastic housing at a pivot point and in contact with the contact pin, wherein the switch assembly includes an actuating signal that verifies that the cable mount is correctly installed in the mounting fixture.

10. A cable mount and fixture system comprising:
- a base;
- a mounting fixture mountable to the base, the mounting fixture having an opening for receiving a cable mount;
- a cable mount having at least one leg including at least one barb, the cable mount insertable into the opening of the mounting fixture; and
- a switch assembly connected to the mounting fixture, the switch assembly includes a contact pin extending into an opening defined within the mounting fixture and a plastic right angle arm connected to a plastic housing at a pivot point and a metal plate inserted on the right angle arm, the metal plate in contact with a plurality of metal contacts, wherein the switch assembly includes an actuating signal that verifies that the cable mount is correctly installed in the mounting fixture.

* * * * *

UNITED STATES PATENT AND TRADEMARK OFFICE

CERTIFICATE OF CORRECTION

PATENT NO. : 7,278,614 B2 
APPLICATION NO. : 10/927304
DATED : October 9, 2007
INVENTOR(S) : Jack E. Caveney et al.

It is certified that error appears in the above-identified patent and that said Letters Patent is hereby corrected as shown below:

Title page, item (75) Inventors: Gary L. Zemach, Cumming, GA (US) should read -- Gary L. Zernach, Cumming, GA (US).

Signed and Sealed this

Sixth Day of May, 2008

JON W. DUDAS
*Director of the United States Patent and Trademark Office*